2,804,437

DIATOMITE-PHENOL-FORMALDEHYDE ANTISWEAT COATING

Siegbert Katz and Siegmund Kut, Cardiff, Wales, assignors to Pearl Varnish Company Limited, Pontypridd, Wales No Drawing. Application September 25, 1953, Serial No. 382,448

Claims priority, application Great Britain September 30, 1952

1 Claim. (Cl. 260—19)

This invention relates to anti-condensation coating compositions yielding films which prevent or reduce the development of surface condensation in humid atmospheres.

Anti-condensation coating compositions are known which are essentially heavy bodied materials made up with a large proportion of relatively coarse or fibrous filler, usually ground cork or expanded vermculite. These compositions are applied in thick layers and function mainly by reason of their porosity and rough surface, the coatings obtained absorbing more water than a normal paint coating and allowing considerable absorption of moisture before actual run-off occurs. Such compositions, however, suffer from the disadvantages of difficulty of application and slow drying, and they are seldom decorative in appearance, a very rough surface being formed. Moreover cork is a combustible material so that the compositions comprising cork are inflammable.

It has now been found however that the production of a macroscopically rough surface is not necessary to the prevention of condensation and that improved anti-condensation compositions can be obtained which provide coatings that are macroscopically smooth.

According to our invention an anti-condensation coating composition comprises a film-forming binder which is selected from the group consisting of natural and synthetic drying and semi-drying oils, natural and synthetic resins, and cellulose derivatives and which is dispersed in water and a material of low thermal conductivity dispersed throughout the composition, said material comprising a cellular material such as diatomite in amount from 10 to 45% by weight of the composition and the solid constituents of the composition being so finely divided that the composition, on drying, yields a coating that is smooth to the touch.

The higher the percentage of diatomite or other cellular material of low thermal conductivity in the composition the faster is the drying and hardening of the film, particularly in very thick layers, and the better the anticondensation properties, and the composition preferably contains from 20 to 45% by weight of diatomite or other cellular material.

Preferably according to this invention the composition is of the emulsion type, water being the continuous phase. Preferably, moreover, the composition includes a minor amount of a fibrous material of low thermal conductivity, particularly asbestos, since it has been found that the inclusion of a fibrous material in the composition prevents any tendency of the dry coating to crack, which sometimes occurs when the composition contains a large proportion of cellular or porous material such as diatomite and when thick layers of the composition are applied. The incorporation of asbestos fibre also increases the rate of hardening of the coating. Examples of other fibrous materials which may be employed are mineral wool, glass fibres and glass wool.

As the cellular or porous material of low thermal conductivity we prefer to use diatomite (diatomaceous earth). This material has a porosity of 75–85% voids by volume which permits of more rapid evaporation of the water and possible solvents present and therefore the compositions dry readily and quickly, a factor of especial importance where it is desired to apply a thick layer of the composition. This high porosity also facilitates the oxidation of any oxidizable binder present. Further, by means of diatomite, films of good toughness and durability may be obtained. The particles of diatomite appear to intermesh to form a reinforcing framework in the set composition, which improves the flexibility of the film, permits it more readily to expand and contract with temperature variations and thus minimizes checking and cracking. Due also to the property of the particles of diatomite of knitting together, the application of one coat of the composition over another, with strong adhesion between the coats, is facilitated and the particles knit into irregularities of the surface being painted and adhere strongly thereto. These properties are especially advantageous and important in the case where a thick layer is applied. Diatomite has also a low density, making for a light-weight coating composition and facilitating the making of compositions in which the suspension of the material of low thermal conductivity is relatively stable. The water-resistance and chemical inertness of this material are further advantages with regard to, e. g., formulation and durability. Moreover the material is fire-resistant.

There may be employed however, alone or in any desired admixture, other materials of low thermal conductivity possessing in their natural state, or formed by processing with, a porous or cellular structure, for example, pumice, basic magnesium carbonate, fuller's earth and cellular plastics.

The average particle size of the diatomite or other cellular or porous material of low thermal conductivity is preferably from 1 to 40 microns, it being understood that in any particular case the particle size may range up to 100 microns or more. Where a fibrous material is incorporated in the composition any length of fibres may be used that permits satisfactory dispersion to be obtained.

As the film-forming binder, which is preferably emulsified with water, there may be employed one or more of the natural and synthetic film-forming materials (including those drying by oxidation and/or condensation and those drying by solvent evaporation) commonly used for paints. These are chosen as desired and required for particular application (e. g. for flame-resistance) and include treated and untreated natural and synthetic drying and semi-drying oils (e. g. linseed oil), varnishes (e. g. 3:1 wood oil and phenol-formaldehyde condensate varnish and 3:1 linseed stand oil and natural resin) and natural and synthetic resins, such as vinyl derivatives (e. g. polyvinyl acetate, polystyrene and styrenebutadiene), oil-modified alkyd resins, phenolic resins and oil copolymers (e. g. styrenated oils and alkyds), and cellulose derivatives.

Generally the composition will include one or more emulsifying agents, and/or one or more protective colloids and/or one or more thickening agents, and it may include a plasticizer and solvent.

As protective colloids and thickening agents there may be used such natural or synthetic materials as are commonly used in emulsions, e. g. casein, glue, methyl cellulose and alginates. These agents may be dissolved in water or alkali or other solvent as necessary to obtain them in solution. It is advantageous, though not absolutely necessary, to use a solution yielding a water-insoluble film, e. g. casein dissolved in a dilute solution of a volatile base or zinc alginate dissolved in ammonia solution.

As emulsifying agents there may be used any of the type promoting oil-in-water emulsions, examples being soaps, sulphated compounds and sulphonated compounds. Clay, colloidal clay (e. g. bentonite) and/or silicates may also be included.

The compositions according to our invention may include preservatives and fungicides and also foam-promoting agents since it is desirable to trap air within the coating. Strong agitation of the composition before use contributes to good insulation properties in the final coating.

The materials of low thermal conductivity may have insufficient covering power for use alone and it is therefore sometimes desirable also to incorporate normal pigments such as lithopone or titanium dioxide. Extenders such as barytes or china clay, or mica, or whiting may be added if desired to improve the consistency, suspension and physical properties, following the usual paint practice. Colouring pigments to give a desired shade may also be incorporated. Dispersing agents such as sodium pyrophosphate, sodium hexametaphosphate and polyethylene oxide compounds may also be used in the manufacture of the compositions and, if desired, corrosion inhibitors such as sodium nitrite, sodium benzoate or morpholine may be included.

Preferably the ratio of water-sensitive agents to the oleo resinous or resinous components is not greater than 1:3. A suitable range is generally 1:5 to 1:20.

In manufacturing the coating composition the normal procedure for preparing emulsion paints is preferably followed. For example, the pigment materials, if used, together with the material of low thermal conductivity are mixed and ground (if necessary) in water alone or with wetting agents and/or protective colloids and emulsifying agents. Fibrous materials (if used) are generally not ground and the cellular material such as diatomaceous earth should only be given a light grinding. The pastes may then be mixed in with the preformed emulsion of the oleo resinous or resinous and aqueous components, or the paste may itself be emulsified with the oleo resinous or resinous components. Homogenising of the emulsion may be carried out, but is not usually necessary. Any of the usual variations in emulsifying technique may be used.

It is essential in the manufacture of the coating composition to preserve as far as possible the porous and fibrous structure of the composition and to promote the maximum possible trapping of air. Maximum heat-insulation is thereby obtained.

The following examples are given to illustrate the invention:

Example I

A coating composition is formulated as follows:

| | |
|---|---|
| 9% glue solution | 25.0 parts by weight. |
| Emulsifying agent(s) | 0.5 to 1.0, preferably 1.0, parts by weight. |
| Titanium dioxide | 5 to 10, preferably 8, parts by weight. |
| 3:1 wood oil phenolformaldehyde condensate varnish (75% solids) including requisite driers. | 10 to 20, preferably 18, parts by weight. |
| Diatomite | 15 to 45, preferably 45, parts by weight. |
| Asbestos fibre | 0 to 5, preferably 4, parts by weight. |

The titanium dioxide is ground into all or part of the glue solution, emulsifying agent(s), and, if desired, a small quantity of wetting agent. The diatomite and asbestos fibre are then well mixed in. Alternatively the diatomite and titanium dioxide-water paste may be ground on a standard paint mill, but only lightly, so as to impair as little as possible the insulating properties of the diatomite. The asbestos fibre (unground) is then mixed in. The varnish (with added solvent, if desired, to make it more mobile) is added to the aqueous paste with stirring, in a mixer suitable for emulsification operations, to form the emulsion.

Example II

The following compositions were prepared:

(a)

| | |
|---|---|
| Polyvinyl acetate aqueous emulsion (55 percent solid content, containing 7-20% plasticiser calculated on the polyvinyl acetate). | 35 to 50, preferably 40, parts by weight. |
| Cellosolve acetate | 0 to 5, preferably 4, parts by weight. |

(b)

| | |
|---|---|
| Wetting agent | 0.02 to 0.2, preferably 0.1, parts by weight. |
| Titanium dioxide | 5 to 10, preferably 8, parts by weight. |
| Extender | 5 to 10, preferably 8, parts by weight. |
| Water | 40 to 50, preferably 45, parts by weight. |
| Diatomite | 15 to 30, preferably 25, parts by weight. |

(c)

| | |
|---|---|
| Asbestos fibre | 0 to 5, preferably 3, parts by weight. |

Composition (b) was lightly ground and (c) was mixed in with it. The mixture was added to (a) with stirring.

The consistency of the compositions according to our invention is adjusted to form a product which, in one or several operations, as desired, can be applied to yield an insulation coating of e. g. 1/16 to 1 inch or more thick, depending on the degree of insulation required for a particular purpose. Generally a thinner consistency, achieved by adding more water, is required for spraying.

The compositions of this invention may be applied to practically any surface by any normal method, e. g. brushing or spraying or roller-coating or trowelling and they may be applied over a primer coat if desired. They have very good brushability. If desired, decorative patterns may be shaped on the surface of the coating, the necessary thickness of coating being applied for this purpose. It is important, however, that the coating obtained should not have other paints applied thereto since this would reduce its efficiency.

Coatings produced with the compositions of this invention have excellent thermal insulating properties, and good sound-insulating properties. They have excellent resistance to the formation thereon of condensed water and they have a smooth (at most microscopically rough) surface texture and are of good decorative appearance. By suitable choice of the components selected and their proportions it is possible to obtain a composition that is stable as regards extremes of temperature and is of such consistency that there may be readily applied by brushing or trowelling (or spraying on thinning) a thick film which rapidly dries and hardens to a smooth coating which is washable and resistant to fire, mould, alkalis and other chemicals and which has maximum anti condensation efficiency. Brushes used for application of the composition may be readily cleaned in water.

In order to illustrate some of the advantages of coating compositions according to this invention some comparative tests are given below between a coating composition according to our invention (labelled I) and five conventional anti-condensation paints (labelled A, B, C, D and E). Paint C was based on mica and paints A, B, D and E were based on coarse fillers such as cork. The coating composition I had the following formulation:

| | Parts by weight |
|---|---|
| Water | 25.0 |
| Glue (rabbit skin) | 2.0 |
| Sodium salt of pentachlorophenol | 0.2 |
| Titanium dioxide | 5.0 |
| Mica | 5.0 |
| Diatomite | 25.0 |
| 1:1 phenol-formaldehyde condensate/enamel oil varnish (70% solids) | 20.0 |
| Potassium oleate | 1.0 |

The apparatus employed in the tests was as described in Ministry of Works specification D. D. F. B./111 and consisted of several identical copper canisters mounted on an iron framework. Each canister was in the form of a cylinder open at the top and closed at the bottom by a right-angled cone. The copper canisters were coated externally with the paints under test to give coatings of equal average thickness. The canisters were attached to the iron framework and then filled with ice and water. Under these conditions moisture was gradually deposited on the paint surface by condensation, and commenced to drip from the bottom of the canisters. The drops were caught in measuring cylinders and the amount of water collected was noted periodically. The canisters were coated to equal thicknesses of approximately 0.6 mm. and dried for about a week before testing.

Average room temperature, °F_____ 68
Average relative humidity, percent_____ 65–70

*Results.*—The following table indicates the volumes (in cc.) of condensed water collected from the various paints:

| Time (hrs.) | A | B | C | D | E | I |
|---|---|---|---|---|---|---|
| 0 | 0 | 0 | 0 | 0 | 0 | 0 |
| ½ | 0 | 0 | X | 0 | 0 | 0 |
| ¾ | X | 0 | 0.5 | 0 | 0 | 0 |
| 1 | 1 | X | 2.5 | X | X | 0 |
| 1½ | 4 | 2.5 | 5.5 | 3 | 1 | 0 |
| 2 | 7.5 | 5.5 | 9.0 | 6.5 | 3 | 0 |
| 2½ | 11.2 | 9.0 | 11.7 | 8.7 | 5 | 0 |
| 3 | 14.8 | 12.8 | 14.2 | 11.7 | 8.5 | 0 |
| 3½ | 17.4 | 15.4 | 17.4 | 14.5 | 12.0 | 0.2 |
| 4 | 18.0 | 20.0 | 21.5 | 18.5 | 16.0 | 2.5 |

(X: First drop collected.)

It should be noted that whist a thickness of 0.6 mm. (approximately .025″) is more than ample for mild condensation, the experimental conditions were severe, a temperature difference of 36° F. existing. To entirely eliminate condensation on the coating obtained with our improved composition under such conditions a thicker coating is required. With the conventional paints it is, of course, very difficult to apply thicker coatings due to their coarse structure and inability to dry satisfactorily.

The above results may be compared with those obtained with a glossy enamel, a flat oil paint, and an emulsion paint (a polyvinyl acetate type frequently advertised as "resisting condensation").

| Time | Emulsion Paint | Flat Oil Paint | Glossy Enamel |
|---|---|---|---|
| 0 | 0 | 0 | 0 |
| 10 mins | 0 | 0 | X |
| 13 mins | X | X | 0.1 |
| 20 mins | 0.1 | 0.2 | 0.5 |
| 30 mins | 2.0 | 1.0 | 1.5 |
| 40 mins | 3.0 | 2.5 | 2.5 |
| 1 hr | 6.2 | 5.5 | 5.7 |
| 1½ hrs | 10.6 | 9.6 | 10.0 |
| 2 hrs | 14.6 | 13.4 | 14.0 |

We claim:

An anti-condensation coating composition comprising by weight from about 10% to about 30% of a drying oil and phenol-formaldehyde condensate varnish, from about 20% to about 50% of diatomite and from 0% to about 8% of a fibrous material, said varnish being emulsified in water, water forming the continuous phase, the solid constituents of the composition being so finely divided that the composition on drying yields a coating that is smooth to the touch, and said composition being stable and having such consistency that a thick coating may be applied by brushing or troweling.

References Cited in the file of this patent
UNITED STATES PATENTS

| | | |
|---|---|---|
| 1,982,778 | Andersen | Dec. 4, 1934 |
| 2,006,378 | Whyte et al. | July 2, 1935 |
| 2,151,184 | Burwell | Mar. 21, 1939 |
| 2,195,580 | Rankin | Apr. 2, 1940 |
| 2,336,484 | Klinkenstein | Dec. 14, 1943 |
| 2,342,581 | Hoffmann | Feb. 22, 1944 |
| 2,393,874 | Trent | Jan. 29, 1946 |
| 2,567,678 | Morrison | Sept. 11, 1951 |
| 2,591,904 | Zola | Apr. 8, 1952 |
| 2,674,063 | Willis et al. | July 28, 1953 |

FOREIGN PATENTS

| | | |
|---|---|---|
| 720,326 | Germany | May 5, 1942 |